United States Patent Office 3,110,762
Patented Nov. 12, 1963

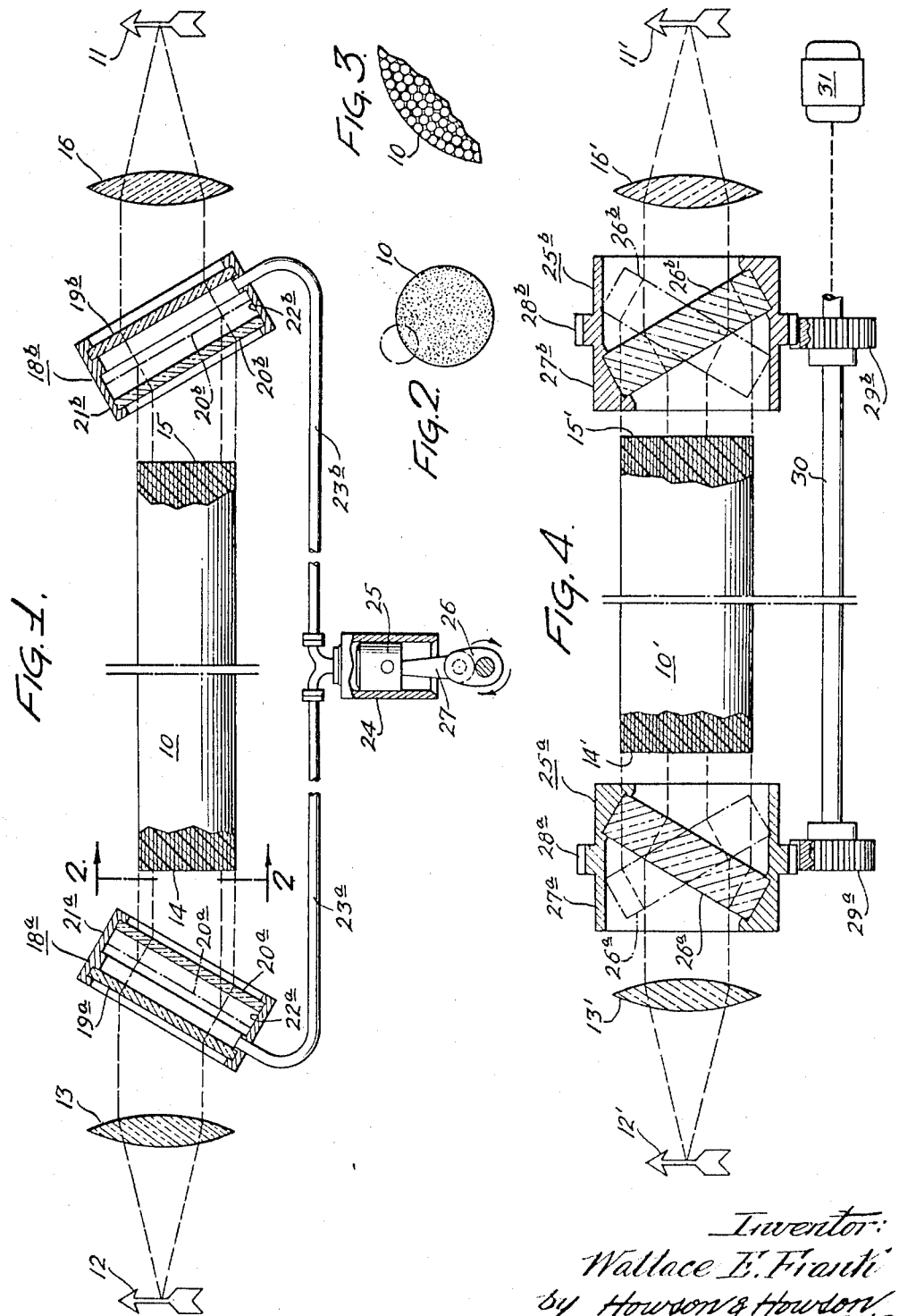

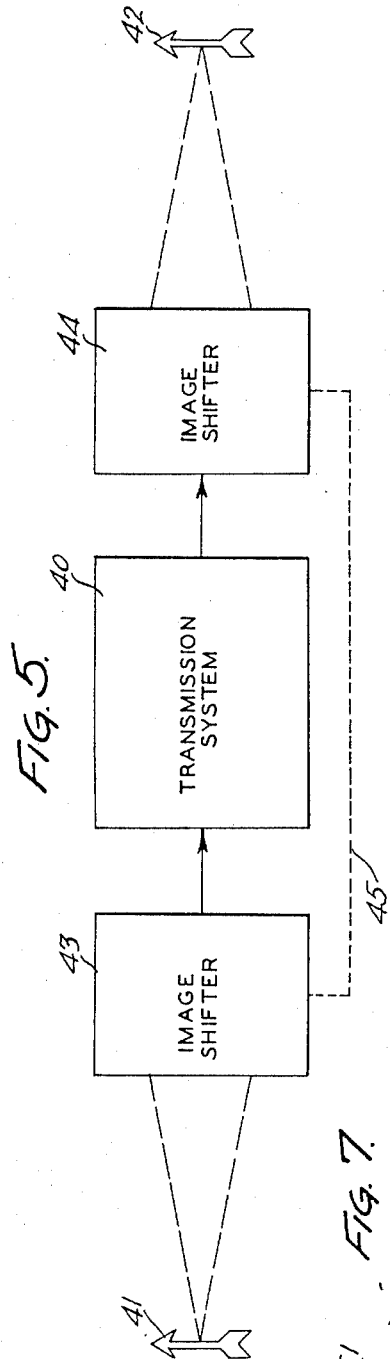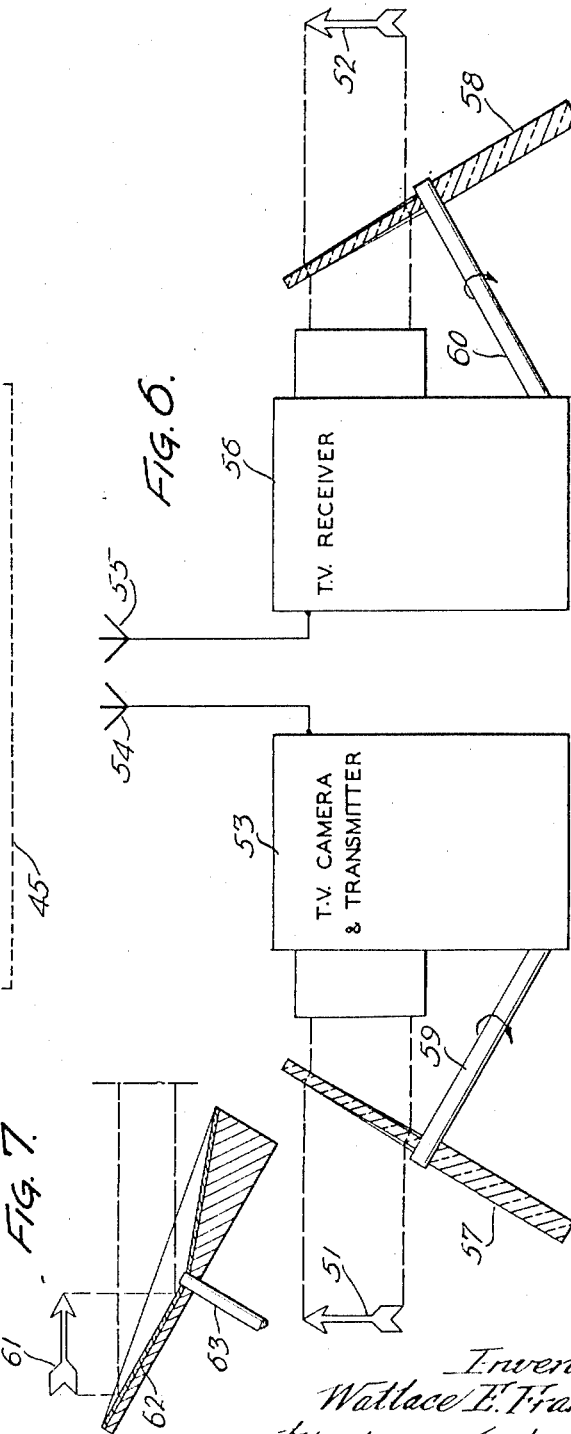

3,110,762
METHOD AND APPARATUS FOR
IMPROVING IMAGES
Wallace E. Frank, Kintnersville, Pa., assignor to The
Franklin Institute, Philadelphia, Pa., a corporation of
Pennsylvania
Filed Apr. 10, 1959, Ser. No. 805,460
6 Claims. (Cl. 178—6)

The present invention relates to method and apparatus for improving image resolution in an optical system which transmits an image of a remotely located object to a location where it may be conveniently viewed. The invention is broadly applicable to such optical systems and may be employed, for example, in such diverse applications as television and fiberoptics image transmission systems. The apparatus employed in each case is but one specific means of carrying out the method of invention.

There are an increasing number of situations in which direct visual observation of an object is not possible, is inconvenient or is unsafe. In some cases, the problem arises from visual inaccessibility, for example, where examination of body cavities is required. In other instances, the problem may be one of protection from hazard, such as radio activity or the like. In almost any system for remote viewing of an image, as opposed to direct viewing of the object, there are problems having to do with making the image as clearly visible as the object itself. The present invention has to do with solution of this problem.

The present invention enables production of clearer images having better resolution of details than has been possible in the prior art. The method involves lateral shifting of the light beam transmitting an image which may be accomplished in a variety of ways using a number of types of apparatus. Each possible apparatus requires a synchronized shifting of image transmitting light beams at the input and output ends of the transmission system. Although the better image involves movement which effectively shifts the image within the system, there is no appearance of unintended image movement relative to its raster and no other effect which would make the image difficult to view is introduced. "Raster" is used herein to mean the bordering reference frame of a picture.

More specifically, the method of the present invention is one for producing an image by shifting the image transmitting light beam at the input end of a light transmission system to continuously and repetitively change its position relative to the pick-up raster. Simultaneously, the image produced at the output end is shifted correspondingly in a pattern of movement similar to that at the input. This procedure is synchronized in such a way that the corresponding points of a fixed object appear to remain in the same location in the viewed image even though there is beam shifting elsewhere in the system. The shifting is preferably done by refractive methods, although reflective methods might be empolyed, and may involve any one of a number of possible techniques. Two of the possible techniques involve repetitively changing the position of one type of light refracting elements or repetitively modifying the effective thickness of another type of light refracting elements.

The apparatus of the present invention consists of an image transmissive system and movable light-displacing elements in the path of light entering the input end and leaving the output end of the transmissive system. The effect of these light-displacing elements is to displace the axis of the image carrying light beam laterally repetitively and in synchronism relative to the rasters of the input or pick-up element and the output element of the light transmission system by means of coordinated movement between the light-displacing elements. This is best done with the elements arranged so that their effect is everywhere equal and opposite.

An understanding of the invention will be obtained by first considering as a specific example two embodiments in which the invention is applied to a fiberscope. The general case will then be considered, followed by specific application to television.

For a better understanding of the present invention, reference is made to the following drawings, in which FIG. 1 illustrates fiberscope apparatus employing the present invention;

FIG. 2 is an end view of the light transmitting fibre bundle looking from line 2—2 of FIG. 1 into the input end thereof;

FIG. 3 is an enlarged view showing individual fibers of the bundle within a region of FIG. 2 enclosed by a dashed circle;

FIG. 4 shows a modified fiberscope apparatus embodying the invention;

FIG. 5 is a block diagram generalizing the systems of FIGS. 1 and 4;

FIG. 6 is a schematic diagram illustrating application of the present invention to television; and FIG. 7 is a schematic diagram of a part of a system employing a reflective technique.

A simple system for conveying an image from one location relatively proximate to the objects to be viewed to another location remote or hidden from the object to be viewed is the so-called "fibrescope." This instrument consists essentially of a bundle of light-transmitting fibres which are arranged in the same relative position to one another at the light input end and the light output end.

To date, fibrescopes have had limited application for a number of reasons. One of the most important of these is relatively poor image resolution which results where every fibre is not hand picked for extremely high quality of transmission properties. Careful selection of the fibres, on the other hand, becomes an extremely expensive procedure and even with this precaution transmission properties inevitably differ from one fibre to another so that the resolution over the full image is not uniform. Even with careful selection of the fibres and great care in assembling the fibre bundle it is possible for some image distortion to be introduced by the slight difference in relative fibre positions at opposite ends of the fiber bundle. The present invention overcomes these problems to a large degree and greatly improves static or semi-static fibrescope produced images.

FIGS. 1–4 concern fibrescope systems employing fibre bundles as light transmitting means. In FIGS. 1 and 4, the light transmitting fibre bundle 10 or 10', as may be observed from the detailed views in FIGS. 2 and 3, consists of a multitude of fibres held together such that their arrangement at opposite ends of the bundle is essentially the same. The fibre bundle itself is flexible and may be taken around bends or corners. It is also relatively small and may be fed through small openings. In general, fibrescopes consist of a bundle, usually of hundreds of glass fibres, each of which has the property throughout its length of internal reflectance to a sufficient degree that light within a critical angle from its longitudinal axis at the input of a particular fibre will be gathered and transmitted through the length of the fibre with little attenuation.

Each system is adapted to produce at its output end an image 11 or 11' of an object 12 or 12' at its input end. This may be accomplished by producing an image at the input end of the fibre bundle by means of lens 13. This image is effectively dissected into a plurality of small parts or pieces the effective size of the fibre on which it impinges and these small images are transmitted from the input end 14 or 14′ to the output end 15 or 15′, whence by means of lens 16 or 16′ they are projected onto a suitable viewing surface to produce composite image 11 or 11′. Of course, in certain instances no projection surface is employed, the eye being substituted for it in direct viewing. The eye may also eliminate the need for lens 16 or 16′.

If any fibre is defective, the part of the image which impinges on it will either not be transmitted at all or will be poorly transmitted relative to the other image pieces transmitted by other fibres. Even when great care is used in selection of the fibres, the transmission properties of the fibres differ from one another so that certain ones of them tend to transmit image portions better than others. The result is poor image resolution in general or specifically poor resolution over at least part of the image.

The present invention greatly improves this image resolution by shifting the image around over the fibrescope so that each fibre carries a different portion of the image during different parts of the scanning cycle. The word cycle is used because the movement of the image is preferably done not only continuously but repetitively in the same way as far as the fibrescope itself is concerned. This may be accomplished by moving the light beam transmitting the image up and down and back and forth relative to the fibres or by moving the light beam in a circular pattern over the ends of the fibres, or by any other suitable movement.

The actual resolution of a static image is also improved by the scanning technique, even though the fibres may be perfect and identical.

Different means for accomplishing the shifting of the image are shown in FIGS. 1 and 4. The means differ not only in kind but in result. Thus in FIG. 1, the image is shifted up and down because of changes in effective thickness of the refractive type image shifting means. In FIG. 4, another refractive type of image shifting device causes the image to move in a circular pattern at the input end of the fibrescope. Whichever pattern is assumed at the input end 14 of the fibrescope will appear inevitably at the output end 15 of the fibrescope. If it is desired that fixed points on a fixed object 12 or 12′ should appear to remain fixed, this effective movement must be cancelled and it is most convenient to cancel it by use at the output end of refractive means of a type similar to that at the input end.

Referring specifically to the system shown in FIG. 1, the refractive image-shifting means at the input end is generally designated 18a whereas the refractive image-shifting means at the output end of the fibrescope is generally designated 18b. The suffix a is used to designate members associated with the refractive member at the input end of the fibrescope and the suffix b is used to designate corresponding members at the output end. Each refractive element consists of a pair of light transmissive members 19a, 20a and 19b, 20b, respectively, which are relatively movable relative to one another. In this particular embodiment, the members are preferably glass plates or discs of generally circular form which are supported within metallic sleeves 21a and 21b, respectively. The plates 19a and 19b are held so that they cannot move relative to tubular members 21a and 21b, respectively, whereas plates 20a and 20b are movable relative thereto and slide in an annular channel 22a and 22b specifically provided for the purpose. Movement of plates 20a and 20b is caused by a fluid fed into the enclosure between plates 19a, 20a and 19b, 20b within the sleeves 21a and 21b, respectively through supply lines 23a and 23b from a cylinder reservoir 24 in which a piston 25 is moved in reciprocating movement by rotating crank 26 connected to the linking piston rod 27. Any suitable rotational drive (not shown) may be employed.

The fluid which is used is preferably a clear fluid having a refractive index as close as possible to that of plates 19a, 20a and 19b, 20b. When the piston is in the position shown, the plates 20a and 20b assume the extended positions shown in full lines. As the piston is withdrawn fluid from cylinder 24 flows between the plates 20a and 20b to move them to the positions shown in dashed lines, thus effectively reducing the thickness of the refractive member. This has the effect in refractive member 18a of shifting the image downwardly as the thickness is increased and shifting the image upwardly as the thickness is decreased, thus moving the image up and down on the input end 14 of the fibrescope. The image moves correspondingly at the output end 15 whence it is picked up by refractive member 18b. In this case, as the refractive member 18b decreases in thickness, the elevation of the image is lowered and as it increases in thickness the elevation of the image is raised. Since the action of member 18b is opposite that of member 18a, its movement tends to compensate movement of member 18b so that if their angles to the beams are equal and opposite and the amount of movement is the same, the image 11 appears to stand still even though the image is constantly moving within the fibrescope.

Referring now to FIG. 4, the refractive elements generally designated 25a and 25b in this case are disks 26a and 26b preferably of glass or other solid refractive material. The disks are of constant thickness and are preferably mounted so that their axes lie at an angle to the axis of the light beam which passes through them. The disks 26a and 26b are preferably supported in this position in members 27a and 27b having an axis of rotation coincident with or parallel to the axis of the light beam passing through the plates 26a and 26b. This may be accomplished by mounting members 27a and 27b in suitable bearings on suitable supports (not shown). Rotation may be imparted by gear means 28a and 28b on support members 27a and 27b driven by spur gears 29a and 29b. Suitable mechanical connection schematically indicated by shaft 30 is provided to keep the rotation of plates 26a and 26b in synchronism. This system is driven by prime mover 31.

Consideration of a particular point on the object 12 will show that as member 26a, for example, shifts from the position shown in full lines to the position shown in dashed lines that particular point of the image moves relative to the input end 14′ of the fiberscope 10′. Further consideration will indicate that that point moves in a circular path rather than in an oscillatory one along the line as in the case of the arrangement of FIG. 1. The image as a whole is thus moved in a circular pattern over the input end of the fibrescope 14′. Corresponding movement appears at the output end 15′. Refractive member 25b is adapted to cause effective movement of the picture appearing at the output end 15′ of the fibrescope so that a circular pattern is scanned preferably at a rate exceeding the persistence of vision. By selecting an arrangement such that the refractive member 25′ is 180° out of phase with refractive member 25a, and exactly equal and opposite in effect, a particular point on a stationary object under observation appears to be stationary in the image.

The discussion heretofore has been directed to two specific embodiments of a fiberoptics system employing the present invention. Attention will now be directed to the generalized system and method of the present invention. It will be appreciated in the first place that the present invention need not be limited to visible light, but may be applied to other types of energy. It will be seen from the generalized system that other energy, such as X-ray energy, electron beam energy, or the like, might be employed instead using suitable transmission and energy beam deflecting means. For the sake of clarity, however, discussion has been, and will be, in terms of visible light.

Referring specifically to FIG. 5, the method and system of the present invention in general involves some transmission system, shown schematically as block 40. This transmission sytem, for example, a shown in FIGS. 1–4, may be a fibre bundle or, as shown in FIG. 6, may be a television system. Broadly, the term "transmission system" here is intended to include components at both pick-up and receiver ends whereby the light or other suitable energy is rended transmissible at the pick-up end and and rendered visible, or usable, by visual or other appropriate means at the receiver end. If an object 41 is to be viewed as an image 42 at some remote location, it must pass through the transmission system 40 in a conventional manner. In accordance with the present invention, however, before it enters the transmission system the light beam carrying the image must effectively be shifted relative to the transmission system, or more specifically relative to the raster of the pickup component. In the usual case the light beam will be laterally shifted with respect to its axis by suitable reflective or refractive means, such as those previously described, each of which may be termed an image shifter. Actually it is usually the medium carrying the image rather than the image which is shifted. There must be an image shifter 43 at the input end of the transmission system and an image shifter 44 at the output end of the transmission system. The input and output image shifter must be coordinated in some way by suitable coordinating or coupling means 45 so that they will effectively run synchronously and produce equal and opposite effects at all times. In other words, in accordance with the method of the present invention, the image shifters affect the transmission light beam by shifting it vectorially equal amounts in opposite directions at opposite ends of the transmission system by equal amplitudes. As a consequence of operating the system described in accordance with the method described, an image 42 appears stationary or moving to the same extent that the object 41 is stationary or moving and its raster or reference frame remains stationary at all times.

FIG. 6 is shown in further illustration of the possibilities of the system. In FIG. 6 an object 51 is used to produce image 52. The transmission system consists of a TV camera and transmitter 53 which converts light energy to radio energy and radiates that radio energy in conventional manner through antenna 54. The energy radiated from transmitter antenna 54 is picked up by receiver antenna 55 and fed to an appropriate television receiver 56 for reconversion to light energy and the production of an image. The system is unconventional only insofar as the addition of image shifting members 57 and 58 are concerned. As illustrated, these members are refractive prismatic wheels having constant thickness along a given radial line but with the thickness varying circumferentially from a minimum at a point corresponding to zero degrees to a maximum at 180° and back to a minimum of 360° or zero degrees. These elements are mounted on shafts 59 and 60 at a slight angle to the perpendicular to the axis of light transmission. These shafts may be appropriately driven by suitable means, which preferably cause them to rotate in the same direction and which keep the wheels in synchrnoism with one another so that their effect is equal and opposite. Their effect is to shift the image carrying beam vertically up and down depending on the thickness of the part of the wheel through which they are passing at a given time.

FIG. 7 illustrates the image shifting portion of a modified arrangement employing a reflective element instead of a refractive element. In the drawing the image 61 is reflected from mirror 62 which is rotated by drive means attached to shaft 63. The mirror surface has a constant angle to the shaft along any radial line, but the angle changes from one radius to another so as to effectively shift the image as the mirror rotates. The image transmission system is not shown but could be any of the conventional types previously shown. An image shift-er at the other end might be another mirror arranged to correct the shift imposed at the pickup end, or it might be a refractive member adapted to do the same job. The image shifter or means displacing the image carrying beam at the two ends of the system however, must be synchronized to run at the same speed and at such phasing that correction is imparted before the image is viewed. Suitable synchronizing means, such as those previously shown, or a suitable servo system, for example, may be employed.

From the above description, it will be understood that there are many possible variations in the present invention. The two broad areas of application described are merely representative of the scope of the invention. The detailed embodiments of the fibrescope are directed to two preferred forms which will find wide use in many practical systems. The systems illustrated are highly schematic and in practical systems, for example, means for holding the refractive elements, or the like, relative to the input of the transmission system and relative to the other optical elements in the system will be required. Such supporting structure and other structure omitted for clarity may be provided by any convenient arrangement and is not intended in any way to limit the scope of the present invention. All systems for accomplishing the ends of the invention, however, which fall within the scope of the claims, are intended to be within the scope and spirit of the present invention.

I claim:

1. A system for transmitting an image from one point to another comprising an image transmission system, a light refracting first image shifter having its axis at an acute angle with the beam path of light entering the input end of the transmission system and consisting of a light transmitting fluid between solid light transmitting members, at least one of which is movable relative to the other, and means repetitively alternately increasing and decreasing the volume of fluid between the solid members to change the effective thickness of the image shifter in a repetitive oscillatory manner, a second image shifter of corresponding type to the first arranged in the path of the light beam leaving the output end of the transmission system to compensate for the apparent shifting of the image produced by the first image shifter, and means synchronizing movement of the image shifters such that the image of a stationary object will remain essentially stationary relative to a fixed reference frame raster.

2. The optical system of claim 1 in which the cyclic pumping means is provided to supply to and withdraw from the refractive elements fluid to modify their relative thicknesses.

3. The optical system of claim 2 in which the arrangement of the refractive elements is such that their conditions correspond at all times.

4. An improved television system for providing an improved picture comprising television pick-up and transmission means and at least one television receiver, a movable light-displacing element in the path of image carrying light entering the television camera, means acting upon the light displacing element to keep it in essentially continuous motion in a repetitive pattern which constantly shifts the image, a similar light-displacing element adapted to displace light in the same manner and to a similar degree in the path between the television screen and a position for viewing, means acting upon the similar light displacing element to keep it in essentially continuous motion in a repetitive pattern which will cause the image to appear to remain still, and means synchronizing movement of the movable means acting upon the light-displacing elements such that a stationary object viewed beyond the light displacing member at the output end of the transmission system will produce an image which will appear to remain essentially stationary.

5. A television receiver arrangement comprising a movable light-displacing element in the path of light leaving the television screen adapted to displace the picture laterally in a repetitive pattern, means producing essentially continuous movement of the light-displacing element in a continuous repetitive pattern which constantly shifts the image including means synchronizing the movement of this element with the movement of a corresponding element at the transmitter which is adapted to produce corresponding continuous, repetitive shifting of the image-carrying light beam at the pick-up of the television transmitter by an amount in the opposite direction to cause the picture viewed to appear within a fixed raster, and synchronizing means for synchronizing movement of the light-displacing element with its counterpart at the transmitter.

6. A television transmitter for transmitting an improved image of an object to a remote receiver comprising a transmitter including a television camera, a movable light-displacing element associated with the television camera acting upon the image transmitting light beam entering the camera to shift it laterally in a repetitive pattern of movement, means producing repetitive movement of said light-displacing element to keep it in essentially continuous motion in a repetitive pattern which constantly shifts the image, and means for transmitting a signal for use by television receivers, a similar light-displacing means associated with the screen of the receiver means to keep the similar means in synchronism with the light-displacing member at the camera in order to cause continuous correction of the image on the television receiver screen viewed beyond the similar light displacing means by causing that image to appear to shift an amount equal and opposite to the effect of shift of the light transmitting beam at the television camera.

References Cited in the file of this patent
UNITED STATES PATENTS

| | | |
|---|---|---|
| 1,647,631 | Ives | Nov. 1, 1927 |
| 1,751,584 | Hansell | Mar. 25, 1930 |
| 1,855,370 | Trenor | Apr. 26, 1932 |
| 2,122,750 | Nicolson | July 5, 1938 |
| 2,315,621 | Ives | Apr. 6, 1943 |
| 2,531,974 | Ellett | Nov. 28, 1950 |
| 3,016,785 | Kapany | Jan. 16, 1962 |

FOREIGN PATENTS

| | | |
|---|---|---|
| 394,285 | Great Britain | June 22, 1933 |